Patented Sept. 26, 1944

2,358,866

UNITED STATES PATENT OFFICE 2,358,866

ACID AQUEOUS SOLUTIONS OF CHLORITES

James Douglas MacMahon, Niagara Falls, N. Y., assignor to The Mathieson Alkali Works, Inc., New York, N. Y., a corporation of Virginia No Drawing. Application August 13, 1943,
Serial No. 498,586

8 Claims. (Cl. 252—187)

This invention relates to improvements in the use of acid aqueous solutions of chlorites.

Chlorites, particularly the chlorites of the alkali and alkaline earth metals, are extensively used with advantage in various commercial operations, for example in pulping and bleaching in the paper industry, in the bleaching of other various materials including textiles and the like and in various oxidation processes. In many instances, it has been found particularly advantageous to use the chlorites in acid aqueous solutions. However, such use has heretofore frequently been accompanied by certain disadvantages.

It is known that in acid aqueous solutions the chlorites decompose to a greater or less extent to form chlorine dioxide. There has been considerable speculation as to the relative effectiveness of the chlorine dioxide and the chlorite ion, respectively, in such operations. However, difficulties arising out of the evolution of chlorine dioxide in such operations are well recognized.

Frequently, commercial operations using acid aqueous chlorite solutions are conducted in metal tanks or vats. Chlorine dioxide is very corrosive and even where vessels fabricated of certain types of stainless steel are used, excessive evolution of chlorine dioxide tends to cause corrosion or pitting of the metal surfaces, particularly portions thereof exposed to the vapor phase adjacent to the surface of the solution. Accordingly, the evolution of chlorine dioxide is frequently objectionable from the standpoint of corrosion. Further, the escape of chlorine dioxide gas from the solution represents a loss in bleaching or oxidation value and, if excessive, may also result in objectionable atmospheric conditions in the vicinity of the operation.

Also, excessive concentrations of chlorine dioxide tend to cause a discoloration of animal fibers such as wool and silk, usually tending toward a reddish or yellowish cast. Also, in the bleaching of sponges, using acid chlorite solutions, excessive concentrations of chlorine dioxide may result in color instability of the sponge. Further, in laundry wash rooms, where chlorites are used in the souring step of commercial laundry operations to combine souring and bleaching, which rooms are frequently congested and inadequately ventilated, the escape of substantial quantities of chlorine dioxide into the atmosphere is particularly objectionable both from the standpoint of the personnel and from the standpoint of possible corrosion of metal equipment.

In accordance with my present invention, the evolution or formation of chlorine dioxide may be repressed so as to avoid the difficulties heretofore experienced in the use of chlorites in acid aqueous solutions. I have discovered that the formation of chlorine dioxide in such solutions may be materially repressed or even substantially eliminated, without deleteriously affecting the utility of the solution, by the presence of hydrogen peroxide.

I have discovered that, by the addition of hydrogen peroxide as such or of compounds capable of yielding hydrogen peroxide in the environment of the solution, for example sodium perborate, sodium percarbonate and the like, the evolution of chlorine dioxide under moderately acid conditions may be either partially or completely repressed and that, under such conditions, the hydrogen peroxide either does not react with the chlorite ion at all or, if so, reacts only to such a limited degree as to result in no interference with the latter as a bleaching or oxidizing agent.

The invention thus provides practical means whereby the concentration of chlorine dioxide in the solution may be controlled to a considerable extent and the rate at which $ClO_2$ is generated may be so regulated as to prevent the escape of any considerable quantities of $ClO_2$ from the solution.

I cannot state with certainty the precise chemical reaction by which the formation of chlorine dioxide is repressed. However, the utility of my invention is not dependent upon any precise understanding of the principle involved and I do not intend to be bound to any theory as to its operation. In referring herein to the formation, generation or evolution of chlorine dioxide, I do not intend to distinguish between a condition where the actual formation of chlorine dioxide is retarded or prevented and a condition where the chlorine dioxide may be formed as such but is so rapidly reconverted to the chlorite or converted to some unobjectionable compounds as to repress the accumulation of chlorine dioxide in the solution.

It has been known that alkaline hydrogen peroxide reacts with chlorine dioxide to reduce the chlorine valence of the latter to that of the chlorite ion. It has also been known that, under extreme acid conditions, i. e. below pH 1, chlorine dioxide and hydrogen peroxide do not react with one another at normal temperatures. But, so far as I am aware, it has not been known heretofore that the evolution of $ClO_2$ could be repressed in an acid aqueous chlorite solution without substantial interference with the bleaching or oxidizing action of the solution by the presence of hydrogen peroxide.

The extent to which the evolution of chlorine dioxide is repressed in accordance with my invention varies with particular operating conditions including temperature and concentration of hydrogen ions, chlorite and hydrogen peroxide in the solution. At a constant temperature, for example 80° C., the extent of repression decreases with an increase in hydrogen ion concentration, i. e., a decrease in the pH of the solution. At a constant pH, as for example pH 4, the extent of the repression decreases with an increase in temperature. However, over an observed broad range of variations of temperature and concentrations, I have found that the presence of hydrogen peroxide does not materially interfere with the bleaching or oxidizing action of the chlorite ions.

A possible explanation of the results obtained is that the oxidation potential of hydrogen peroxide is sufficiently lower than that of chlorine dioxide to induce an appreciable reaction between them whereas the difference in oxidation potential of hydrogen peroxide and of the chlorite ion is not sufficient to cause them to react to any significant extent. According to this theory, it would appear that the concentration of chlorine dioxide existing in the solution at any given time depends upon the balance that is maintained between the rate at which the chlorine dioxide is reduced by the hydrogen peroxide and the rate at which the chlorite ion is converted to chlorine dioxide. While not binding myself to this theory, I have found it useful in interpreting my experimental results.

As previously noted, the extent of the repression of $ClO_2$ evolution by the presence of hydrogen peroxide varies appreciably with the particular operating conditions employed. The effect of these variables appears from the following specific illustrations of the application of my invention under the indicated operating conditions. For comparison, the amounts of $ClO_2$ evolved under similar conditions where the $H_2O_2$ is omitted are also shown.

In each of the following examples, I to VIII inclusive, an equal volume (500 milliliters) of acid aqueous sodium chlorite solution was used and the repressive effect of the hydrogen peroxide under the various conditions, measured in terms of the number of milligrams of chlorine dioxide generated in a period of thirty minutes. The amount of $ClO_2$ generated was determined by aerating the $ClO_2$ from the solution into an absorption tower containing a potassium iodide solution and then titrating the solution from the tower with a standard thiosulfate solution.

Example I

The effect of variations in hydrogen ion concentration on the repressive action of the hydrogen peroxide is illustrated by a series of operations in which acid chlorite solutions of equal sodium chlorite concentration, in some of which no hydrogen peroxide was present and to others equal amounts of hydrogen peroxide were added, were tested at pH values of from 2 to 7. In each of these tests, a temperature of 80° C. was maintained and the initial concentration of sodium chlorite in each was equivalent to 2 grams per liter of available $Cl_2$. The initial concentration of hydrogen peroxide in the solutions to which it was added was in each instance equivalent to 2 grams per liter of 100-volume $H_2O_2$. The number of milligrams of $ClO_2$ generated in 30 minutes in the respective operations was as indicated in the following tabulation:

| pH of solution | Milligrams $ClO_2$ generated in 30 min. | |
|---|---|---|
| | Chlorite | Chlorite-peroxide |
| 2 | 232 | 175 |
| 3 | 85 | 51.5 |
| 4 | 38.1 | 11.6 |
| 5 | 14.6 | 0.3 |
| 6 | 4.1 | 0.1 |
| 7 | 1.2 | 0.0 |

From the results of these tests it appears that in the acid solutions varying in pH from 2 to 7, the generation of $ClO_2$ was materially repressed, that at pH values of 5 and higher, only very minor amounts of $ClO_2$ were evolved and that a pH of 7 no measurable amount of $ClO_2$ was evolved.

Even in more strongly acid solutions, I have found the presence of hydrogen peroxide to repress materially the generation of $ClO_2$. The repressive action of hydrogen peroxide in solutions having a pH of 1, is illustrated by the following example:

Example II

In each of two acid aqueous solutions of sodium chlorite the initial concentration of chlorite was equivalent to 2 grams per liter of available chlorine. To one, the equivalent of 2 grams per liter of 100-volume hydrogen peroxide was added. In each the acidity was adjusted to pH 1 and a temperature of 40° C. was maintained for 30 minutes. During this period, 205 milligrams of chlorine dioxide was generated in the solution to which no hydrogen peroxide was added while only 117 milligrams of chlorine dioxide was generated in this same period in the solution in which the hydrogen peroxide was present. The results of these tests show that, at pH values even as low as 1, the presence of hydrogen peroxide has a substantial repressive effect on the generation of chlorine dioxide even at relatively low temperatures.

Example III

The effect of the variation of temperature on the repressive action of hydrogen peroxide on $ClO_2$ evolution is illustrated by a series of tests on acid aqueous sodium chlorite solutions each having a pH of 4 and an initial concentration of sodium chlorite equivalent to 2 grams per liter of available chlorine. To half of these solutions, hydrogen peroxide was added in amounts equivalent to 2 grams per liter of 100-volume $H_2O_2$. In the others, no hydrogen peroxide was present. The number of milligrams of chlorine dioxide generated in a 30-minute period, under different temperature conditions, was as indicated in the following tabulation:

| Temp. of solution | Milligrams $ClO_2$ generated in 30 min. | |
|---|---|---|
| | Chlorite | Chlorite-peroxide |
| 40° C | 1.4 | 0 |
| 60° C | 7.2 | 0.5 |
| 80° C | 38.1 | 11.6 |
| 100° C | 137.0 | 26.2 |

Example IV

The effect of the initial concentration of the chlorite on the repressive action of hydrogen peroxide on $ClO_2$ evolution is illustrated by a similar series of experiments in which the acidity of the respective solutions was in each instance pH 4 and the temperature was maintained at 80° C. Also, in each, the initial ratio of available chlorine as sodium chlorite to 100-volume $H_2O_2$ was 1:1.

The number of milligrams of chlorine dioxide generated in the respective solutions in a period of 30 minutes was as indicated in the following tabulation:

| Initial concentration sodium chlorite (g. p. l. available chlorine) | Milligrams $ClO_2$ generated in 30 min. | |
|---|---|---|
| | Chlorite | Chlorite-peroxide |
| 1 | 23.9 | 5.4 |
| 2 | 38.1 | 11.6 |
| 4 | 159.6 | 36.2 |
| 8 | 206.5 | 75.4 |

Example V

The effect of the ratio of chlorite to $H_2O_2$ present in the solution upon the repressive action of the $H_2O_2$ is illustrated by a series of tests in each of which the acidity of the solution was pH 4, the initial concentration of sodium chlorite was equivalent to 2 grams per liter available chlorine and a temperature of 80° C. maintained. In the respective tests, the number of milligrams of chlorine dioxide generated in a period of 30 minutes in solutions varying in initial $H_2O_2$ content from none up to 8 parts of $H_2O_2$ for each 2 parts of chlorite is indicated in the following tabulation.

| G. p. l. available $Cl_2$ as $NaClO_2$ / G. p. l. 100-vol. $H_2O_2$ | Milligrams $ClO_2$ generated in 30 min. |
|---|---|
| 2/0 | 38.1 |
| 2/1 | 14.9 |
| 2/2 | 11.6 |
| 2/4 | 5.3 |
| 2/8 | 4.7 |

Example VI

The effect of variations in the ratio of chlorite to hydrogen peroxide present under different temperature conditions and under conditions of higher initial sodium chlorite concentrations than that illustrated in Example V is illustrated by a series of tests in each of which the initial concentration of sodium chlorite was equivalent to 4 grams per liter available chlorine and a temperature of 60° C. maintained, the pH of the solution in each instance being 4. The number of milligrams of chlorine dioxide generated in the thirty-minute period in each instance is recorded in the following tabulation:

| G. p. l. available $Cl_2$ as $NaClO_2$ / G. p. l. 100-vol. $H_2O_2$ | Milligrams $ClO_2$ generated in 30 min. |
|---|---|
| 4/0 | 15.8 |
| 4/2 | 10.9 |
| 4/4 | 5.9 |
| 4/8 | 4.5 |
| 4/16 | 3.7 |

As previously noted, the repression of $ClO_2$ evolution may be effected in accordance with my invention either by the addition of hydrogen peroxide as such or by the addition to the solution of a compound, for example sodium perborate, sodium percarbonate or the like, capable of yielding $H_2O_2$ in the environment of the solution. The effectiveness of the use of sodium perborate and sodium percarbonate, respectively, is illustrated by the following examples:

Example VII

In a solution containing 4 grams per liter of available chlorine as sodium chlorite, there was generated 103.4 milligrams of chlorine dioxide in 30 minutes at pH 4 and a temperature of 80° C. In a similar solution to which 2 grams per liter of 100 volume hydrogen peroxide was added, there was generated, under the same conditions, 26.9 milligrams of chlorine dioxide. Where 2.48 grams per liter of sodium perborate ($NaBO_2.H_2O_2.3H_2O$), equivalent to 2 grams per liter of 100 volume hydrogen peroxide, was substituted for the hydrogen peroxide, only 19.5 milligrams of chlorine dioxide was generated during the 30 minute period.

Example VIII

To a solution containing 4 grams per liter of available chlorine as sodium chlorite, there was added 1.735 grams per liter of sodium percarbonate ($2Na_2CO_3.3H_2O_2$), equivalent to 2 grams per liter of 100 volume hydrogen peroxide. Under the same conditions as in the preceding example, only 16.6 milligrams of chlorine dioxide was generated in the 30 minute period.

Furthermore, the hereindescribed advantages of my invention may be attained without loss in efficiency of operation. The amount of bleaching or oxidation which may be accomplished by the use of a given amount of chlorite in accordance with my invention is usually equal to that accomplished in accordance with conventional practices. This is illustrated by the following examples:

Example IX 250 cc. of a solution containing 2 grams per liter of available chlorine as sodium chlorite, and no repressing agent, bleached 25 grams of gray cotton muslin to a brightness of 78 in 1 hour, where the temperature was 180° F. and the hydrogen ion concentration was pH 3, the ratio of solution to cloth being 10:1. Under the same conditions the same cloth was bleached to a brightness of 78 with a solution containing 2 grams per liter of available chlorine as sodium chlorite and 3.52 grams per liter of 100 volume hydrogen peroxide. In each instance the solution also contained 1 gram per liter of a sodium salt of a fatty alcohol sulphate as a detergent.

Example X

A 20 gram sample of an air-dried pulp at 5% consistency and having a brightness of 65 and a pH of 4 was treated with 2% available chlorine as sodium chlorite, based on the air-dried pulp, for 2 hours at a temperature of 80° C. During this period 3.96 milligrams of chlorine dioxide was generated and the final brightness of the sample was 82. A similar sample of pulp was treated under identical conditions, except that 1% of 100 volume hydrogen peroxide was added and the pulp was bleached to the same brightness with the generation of only 0.61 milligram of chlorine dioxide.

The invention is generally applicable to operations wherein aqueous solutions of the salts of chlorous acids, for example chlorites of the alkali and alkaline earth metals, are used on the acid side and, as illustrated by the foregoing examples, may be used over a wide range of operating conditions to meet the requirements of the particular operation to which it is applied. It has been applied with particular advantage to the use of acid aqueous solutions of sodium chlorite having a pH greater than 1. The invention may be used with advantage, for instance, in the bleaching or solubilizing of starch, in the treatment of cellulosic materials such as cotton, linen, paper pulp, rayon, cellulose acetate and other cellulose esters and ethers including mixed types, for example cellulose acetate-butyrate, the bleaching of straw such as used in hat-making, the treatment of oils, fats and waxes and the treatment of synthetic protein-like fibers, including materials such as nylon, Aralac and the like.

The advantages of my invention as applied to the bleaching and solubilizing of starch are illustrated by the following example.

Example XI

A 6.5% suspension of corn starch in water was prepared and the pH of the suspension adjusted to 3.5 by means of a buffer. The suspension was then heated to a temperature of 70° C. for a period of thirty minutes, allowed to cool to 50° C. and the batch divided into four parts. To the separate portions, reagents were added as subsequently indicated and each portion maintained at a temperature of 50 C. for two and one-half hours.

The first portion was used as a control and to this no reagent was added. To the second portion, an amount of sodium chlorite equivalent to 1% available chlorine, on the weight of the starch, was added. To the third portion, an amount of hydrogen peroxide was added equivalent to 0.5% of 100-volume hydrogen peroxide, on the weight of the starch. To the fourth portion, both sodium chlorite and hydrogen peroxide were added in proportions equivalent to those added to portions two and three respectively.

Immediately following the two and one-half hours reaction period and cooling of the respective sample to 30° C., the viscosities of the respective samples were measured. Thereafter the samples were permitted to stand overnight at room temperature and their viscosities redetermined. In each instance the viscosity of those portions of the starch which had been treated with the reagents was substantially less than the viscosity of the control portion. However, the viscosity of the starch which had been treated with the acid aqueous chlorite solution in the presence of hydrogen peroxide, in accordance with the present invention, was reduced to a substantially greater extent than that of either the starch treated with the acid aqueous chlorite solution alone or with the hydrogen peroxide alone.

The samples treated with chlorite alone and with the mixture of chlorite and hydrogen peroxide showed a substantial degree of bleaching. However, the sample treated with hydrogen peroxide alone showed little, if any bleaching effect.

There was no visible evidence of the presence of chlorine dioxide in the sample that had been treated with the mixture of chlorite and hydrogen peroxide. However, that portion of the starch which had been treated with the acid chlorite solution alone was found at the end of the reaction period to contain chlorine dioxide to such an extent as to impart a yellow color to the starchy mass and in order to observe clearly the whiteness of the starch it was necessary first to eliminate the chlorine dioxide from the mass by treatment with hydrosulfite. This treatment with hydrosulfite was subsequent to the viscosity determinations.

The hydrogen peroxide may be added as an aqueous solution such as the so-called 100-volume hydrogen peroxide, as 3% solution or any other suitable concentration. The persalts, when used, may be added in the solid form or in solution.

I claim:

1. In the use of acid aqueous solutions containing a chlorite, the improvement which comprises repressing the generation of chlorine dioxide in the solution by the presence therein of $H_2O_2$.

2. In the use of acid aqueous solutions containing a chlorite and having a pH greater than 1, the improvement which comprises repressing the generation of $ClO_2$ in the solution by the presence therein of $H_2O_2$.

3. In the use of acid aqueous solutions containing a chlorite selected from the group consisting of alkali metal and alkaline earth metal chlorites and having a pH greater than 1, the improvement which comprises repressing the generation of $ClO_2$ in the solution by the presence therein of $H_2O_2$.

4. In the use of acid aqueous solutions containing sodium chlorite, the improvement which comprises repressing the generation of $ClO_2$ in the solution by the addition of hydrogen peroxide thereto.

5. In the use of acid aqueous solutions containing a chlorite selected from the group consisting of alkali metal and alkaline earth metal chlorites and having a pH greater than 1, the improvement which comprises repressing the generation of $ClO_2$ in the solution by the addition of hydrogen peroxide thereto.

6. In the use of acid aqueous solutions containing sodium chlorite and having a pH greater than 1, the improvement which comprises repressing the generation of $ClO_2$ in the solution by the addition thereto of a compound which in the environment of the solution decomposes to form $H_2O_2$.

7. In the use of acid aqueous solutions containing sodium chlorite and having a pH greater than 1, the improvement which comprises repressing the generation of $ClO_2$ in the solution by the addition thereto of sodium perborate.

8. In the use of acid aqueous solutions containing sodium chlorite and having a pH greater than 1, the improvement which comprises repressing the generation of $ClO_2$ in the solution by the addition thereto of sodium percarbonate.

JAMES DOUGLAS MacMAHON.